United States Patent
Lentini et al.

(10) Patent No.: US 12,169,915 B2
(45) Date of Patent: Dec. 17, 2024

(54) SYSTEMS AND METHODS TO PROCESS ELECTRONIC IMAGES TO PROVIDE BLUR ROBUSTNESS

(71) Applicant: PAIGE.AI, Inc., New York, NY (US)

(72) Inventors: Rodrigo Ceballos Lentini, Long Island City, NY (US); Christopher Kanan, Pittsford, NY (US)

(73) Assignee: Paige.AI, Inc., New York, NY (US)

( * ) Notice: Subject to any disclaimer, the term of this patent is extended or adjusted under 35 U.S.C. 154(b) by 427 days.

(21) Appl. No.: 17/732,857

(22) Filed: Apr. 29, 2022

(65) Prior Publication Data

US 2023/0010654 A1    Jan. 12, 2023

Related U.S. Application Data

(60) Provisional application No. 63/203,033, filed on Jul. 6, 2021.

(51) Int. Cl.
*G06T 5/73*      (2024.01)
*G06T 3/40*      (2006.01)
(Continued)

(52) U.S. Cl.
CPC .................. *G06T 5/73* (2024.01); *G06T 3/40* (2013.01); *G06T 5/50* (2013.01); *G06T 7/0002* (2013.01);
(Continued)

(58) Field of Classification Search
None
See application file for complete search history.

(56) References Cited

U.S. PATENT DOCUMENTS

2011/0090327 A1    4/2011   Kenny et al.
2017/0323431 A1   11/2017   Sarkar et al.
(Continued)

OTHER PUBLICATIONS

Li S et al: "Multifocus image fusion using region segmentation and spatial frequency", Image and Vision Computing, Elsevier, Guildford, GB, vol. 26, No. 7, Jul. 2, 2008 (Jul. 2, 2008), pp. 971-979, XP022618937, ISSN: 0262-8856, DOI: 10.1016/J.IMAVIS.2007.10.012 [retrieved on Nov. 13, 2007] Sec. 2, Sec. 3, Sec. 4 and Fig. 2.

(Continued)

*Primary Examiner* — Leon Flores
(74) *Attorney, Agent, or Firm* — Bookoff McAndrews, PLLC

(57) ABSTRACT

A computer-implemented method for processing electronic medical images, the method including receiving a plurality of electronic medical images of a medical specimen. Each of the plurality of electronic medical images may be divided into a plurality of tiles. A plurality of sets of matching tiles may be determined, the tiles within each set corresponding to a given region of a plurality of regions of the medical specimen. For each tile of the plurality of sets of matching tiles, a blur score may be determined corresponding to a level of image blur of the tile. For each set of matching tiles, a tile may be determined with the blur score indicating the lowest level of blur. A composite electronic medical image, comprising a plurality of tiles from each set of matching tiles with the blur score indicating the lowest level of blur, may be determined and provided for display.

17 Claims, 11 Drawing Sheets

(51) Int. Cl.
*G06T 5/50* (2006.01)
*G06T 7/00* (2017.01)
(52) U.S. Cl.
CPC ............... *G06T 2207/20021* (2013.01); *G06T 2207/20081* (2013.01); *G06T 2207/20212* (2013.01); *G06T 2207/30004* (2013.01); *G06T 2207/30168* (2013.01)

(56) References Cited

U.S. PATENT DOCUMENTS

2017/0372155 A1* 12/2017 Odry .................. G06F 18/28
2018/0182099 A1* 6/2018 Lesniak ............... G06V 10/993
2020/0381104 A1 12/2020 Ceballos Lentini et al.

OTHER PUBLICATIONS

Li et al: "Combination of images with diverse focuses using the spatial frequency", Information Fusion, Elsevier, US, vol. 2, No. 3, Sep. 1, 2001 (Sep. 1, 2001), pp. 169-176, XP002625396, ISSN: 1566-2535, DOI: 10.1016/S1566-2535(01)00038-0 Sec. 2, Sec. 3 and Fig. 3.

* cited by examiner

SYSTEMS AND METHODS TO PROCESS ELECTRONIC IMAGES TO PROVIDE BLUR ROBUSTNESS

RELATED APPLICATION(S)

This application claims priority to U.S. Provisional Application No. 63/203,033 filed Jul. 6, 2021, the entire disclosure of which is hereby incorporated herein by reference in its entirety.

FIELD OF THE DISCLOSURE

Various embodiments of the present disclosure pertain generally to image processing methods. More specifically, particular embodiments of the present disclosure relate to systems and methods for processing images using multiple scans of an image to reduce an amount of blur.

BACKGROUND

Within the field of image processing, images may need to be in focus and clear for proper analysis or diagnosis to take place. In particular, to correctly diagnose or analyze a medical image (e.g., pathology whole slide images (WSIs), computerized tomography (CT) scan, etc.), a clear medical image may be necessary. Images that contain image blur may pose a problem for individuals or computer systems performing analysis. In particular, the higher the amount of blur or more locations on an image with blur, the more of a problem the image may pose for determining diagnosis and treatment. While substantial amounts of blur may preclude diagnosis, blur may be localized to only a small region of the image. In situations where only small regions of an image contain blur, the image may be suitable for diagnosis if the blurred region is repaired.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for processing electronic medical images, the method including: receiving a plurality of electronic medical images of a medical specimen; dividing each of the plurality of electronic medical images into a plurality of tiles, each tile of the plurality of tiles being of a predetermined size; determining a plurality of sets of matching tiles, the tiles within each set corresponding to a given region of a plurality of regions of the medical specimen; for each tile of the plurality of sets of matching tiles, determine a blur score corresponding to a level of image blur of the tile; for each set of matching tiles, determine a tile with the blur score indicating the lowest level of blur; determining a composite electronic medical image, the composite electronic medical image including a plurality of tiles from each set of matching tiles with the blur score indicating the lowest level of blur; and providing the composite electronic medical image for display A system for processing electronic digital medical images, the system including: at least one memory storing instructions; and at least one processor configured to execute the instructions to perform operations including: receiving a plurality of electronic medical images of a medical specimen; dividing each of the plurality of electronic medical images into a plurality of tiles, each tile of the plurality of tiles being of a predetermined size; determining a plurality of sets of matching tiles, the tiles within each set corresponding to a given region of a plurality of regions of the medical specimen; for each tile of the plurality of sets of matching tiles, determine a blur score corresponding to a level of image blur of the tile; for each set of matching tiles, determine a tile with the blur score indicating the lowest level of blur; determining a composite electronic medical image, the composite electronic medical image including a plurality of tiles from each set of matching tiles with the blur score indicating the lowest level of blur; and providing the composite electronic medical image for display.

A non-transitory computer-readable medium storing instructions that, when executed by a processor, perform operations processing electronic digital medical images, the operations including: receiving a plurality of electronic medical images of a medical specimen; dividing each of the plurality of electronic medical images into a plurality of tiles, each tile of the plurality of tiles being of a predetermined size; determining a plurality of sets of matching tiles, the tiles within each set corresponding to a given region of a plurality of regions of the medical specimen; for each tile of the plurality of sets of matching tiles, determine a blur score corresponding to a level of image blur of the tile; for each set of matching tiles, determine a tile with the blur score indicating the lowest level of blur; determining a composite electronic medical image, the composite electronic medical image including a plurality of tiles from each set of matching tiles with the blur score indicating the lowest level of blur; and providing the composite electronic medical image for display.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
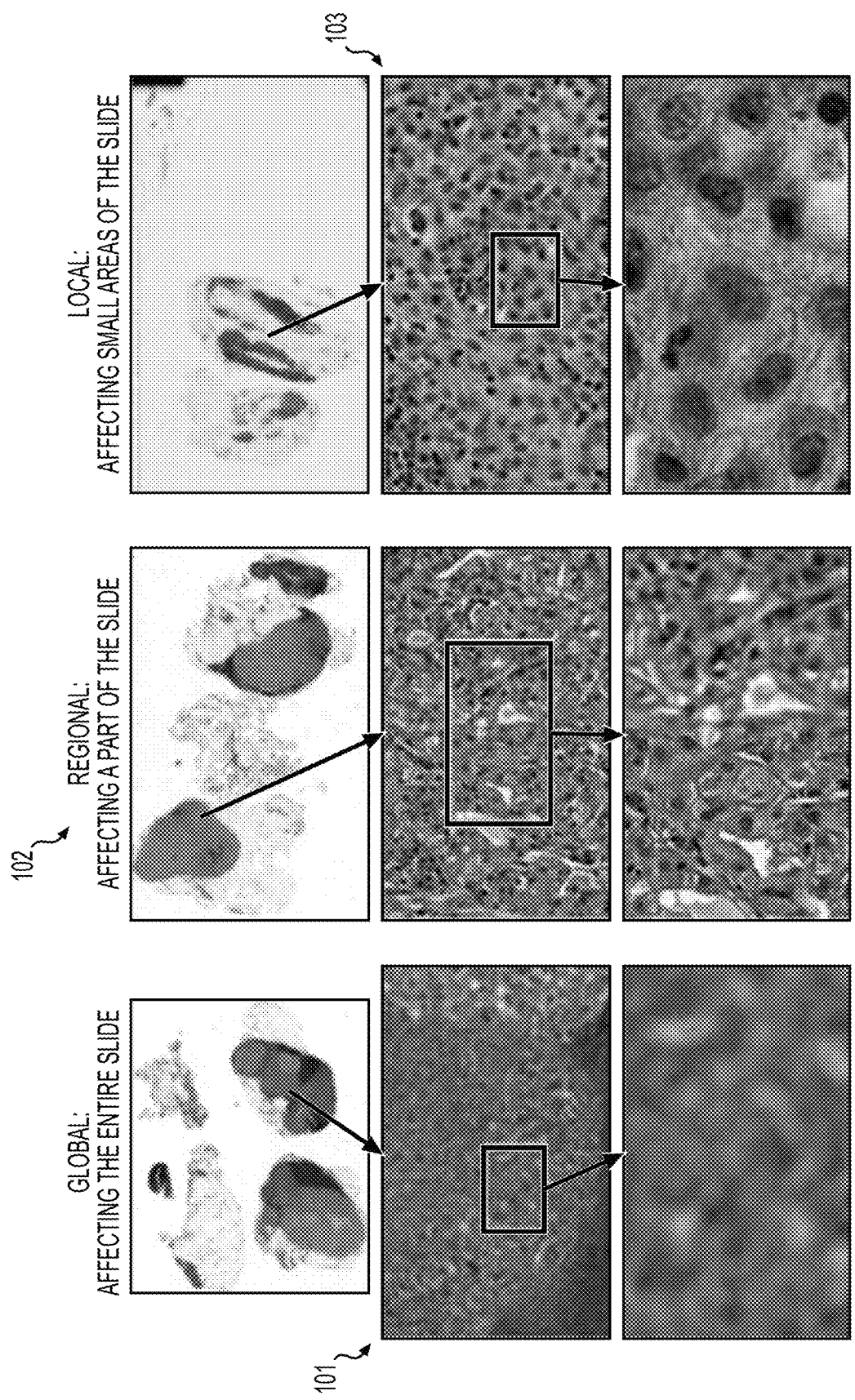
FIG. 1 is an illustration of three images with varying degrees of blur.

According to certain aspects of the disclosure, methods and systems are disclosed for providing a system/process for editing/combining multiple images of a singular specimen, in order to create a new image with the increased clarity/lack of blur. Traditionally, when a medical image was blurred, a rescan of the medical specimen would be necessary. There is a need to fix medical images and to provide a medical image with the least amount of blur, while not requiring a rescan of the medical specimen. Accordingly, improvements in image processing and machine learning are needed in order to de-blur images of a medical specimen.

As will be discussed in more detail below, in various embodiments, systems and methods are described for utilizing image processing techniques and/or machine learning to combine multiple images of the same medical specimen to output an updated medical image with the highest level of clarity (e.g. the lowest level of blur). This may be referred to as an optimized medical image.

Further, in various embodiments, systems and methods are described for using machine learning to reduce blur within a blurred image. By training one or more de-blurring AI models, e.g. via supervised, semi-supervised learning, or supervised learning to learn how to repair blurred pixels within sections of blurred images, the trained de-blurring AI model may be used to generate higher resolution version of images that originally contain blurred sections.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Techniques presented herein describe patching and/or repairing local regions of blur using computer vision and/or machine learning to correct and/or increase the percentage of a medical image that can be considered in-focus without needing to rescan a specimen and/or subject.

Techniques presented herein may relate to using multiple scans of the same image and using image processing techniques and/or machine learning to combine them into one coherent, low-blur image, and/or using generative methods to fill in blur.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Medical imaging scanners may be utilized to produce medical images inside the human body to diagnose or analyze a disease state of tissue. The process and techniques described herein may be utilized to solve certain image focusing issues related to the medical images. For example, a problem for WSIs of tissue is that a WSI may have multiple focus planes. When a WSI has multiple focus planes, crucial diagnostic information may be located on one or more of the multiple focus planes. It may be necessary for all crucial diagnostic information to be "in-focus." Ensuring all or multiple scanned areas of a WSI are in-focus may be difficult. In particular, this may be challenging because WSI scanners may need to balance image quality with scan speed, because a hospital or other organization may have hundreds or thousands of slides to scan per day. Due to these limitations, the resulting WSI may have some amount of blur in best-case scenarios. This may mean that the compromises made in the scanner may result in some small but non-negligible percentage of the image being out-of-focus. Similar issues may occur in most medical imaging technologies, where patient movement, poor calibration and/or misalignment may lead to out-of-focus regions in the image. For example, FIG. 1 (described in greater detail below) depicts portions of WSIs with varying degrees of blur that may occur during medical imaging.

In a typical medical diagnosis workflow, out-of-focus regions in the image may require that re-scan of the specimen be performed when an image is not of acceptable quality, or when a particularly suspicious region is not fully in-focus. This issue may be particularly relevant when utilizing artificial intelligence or machine learning to perform analysis of an image, as blurriness may affect the detection performance of computer vision algorithms. Without the ability to detect and/or repair blur, applications such as quality control (QC), where an AI system runs in the background to verify that the diagnosis of a physician is correct, or triage applications, where the physician only sees non-benign images, may become ineffective and potentially unsafe to deploy.

One solution to this issue may be to have a QC pipeline that detects when an image is of insufficient quality for diagnosis and to order a re-scan (e.g., such as the QC methods described in US20200381104A1, which is incorporated by reference in its entirety). However, this is costly as it involves potentially repeating part of or the entire procedure needed to capture the medical image.

Techniques presented herein may provide an alternative solution to requiring a re-scan. When blur is limited and localized to specific image regions (e.g., as shown in the regional and local panels of FIG. 1), one or more embodiments of the system described herein may be used to repair and/or correct out-of-focus image regions so that the image may be reviewed by a pathologist/physician/researcher and/or a computer/AI system.

FIG. 1 depicts three WSIs with varying degrees of blur. First, WSI 101 depicts a WSI with "global blur." Global blur may mean that an entire WSI is blurred or out of focus. WSI 102 depicts a regional blur on a WSI. A regional blur may mean that blur affects roughly 2% to 50% of a particular slide. For instance, a WSI that has 40% of the slide blurred may be referred to as having a regional blur. WSI 103 depicts a local blur on a WSI. A local blur may mean that only a small region of a WSI is blurred. For example, a small area may be roughly 2% or less of the total image.

Because WSI's may have varying degrees of blur, a system that may perform digital post-processing to correct blur (e.g. out-of-focus issues) may be a valuable part of the diagnostic imaging preparation pipeline.

Techniques presented herein may use computer vision and/or machine learning techniques to repair out-of-focus/blurred issues present in a medical image. An image with blur can be considered to have a location that is information deficient. The location may be out-of-focus, have bokeh, depth of field problems, have incorrect focus, or otherwise lacking clarity. The image may have an artifact, obstruction, partial obstruction, insufficient or improper lighting. Simple image processing techniques, e.g., sharping with an "unsharp" mask, may be inadequate for repairing even small amounts of localized blur. Thus, techniques presented herein may repair an image by using information across multiple images of the same tissue, and/or by using generative machine learning algorithms to create higher resolution image tiles.

The above techniques may work well in a clinical setting because a system may be trained on a very specialized type of image, for example, WSIs stained with hematoxylin & eosin (H&E) scanned in a specific scanner. This consistency in the input space may be expected to improve the results of this method when compared to the more general task of sharpening any image.

Figure 2A:
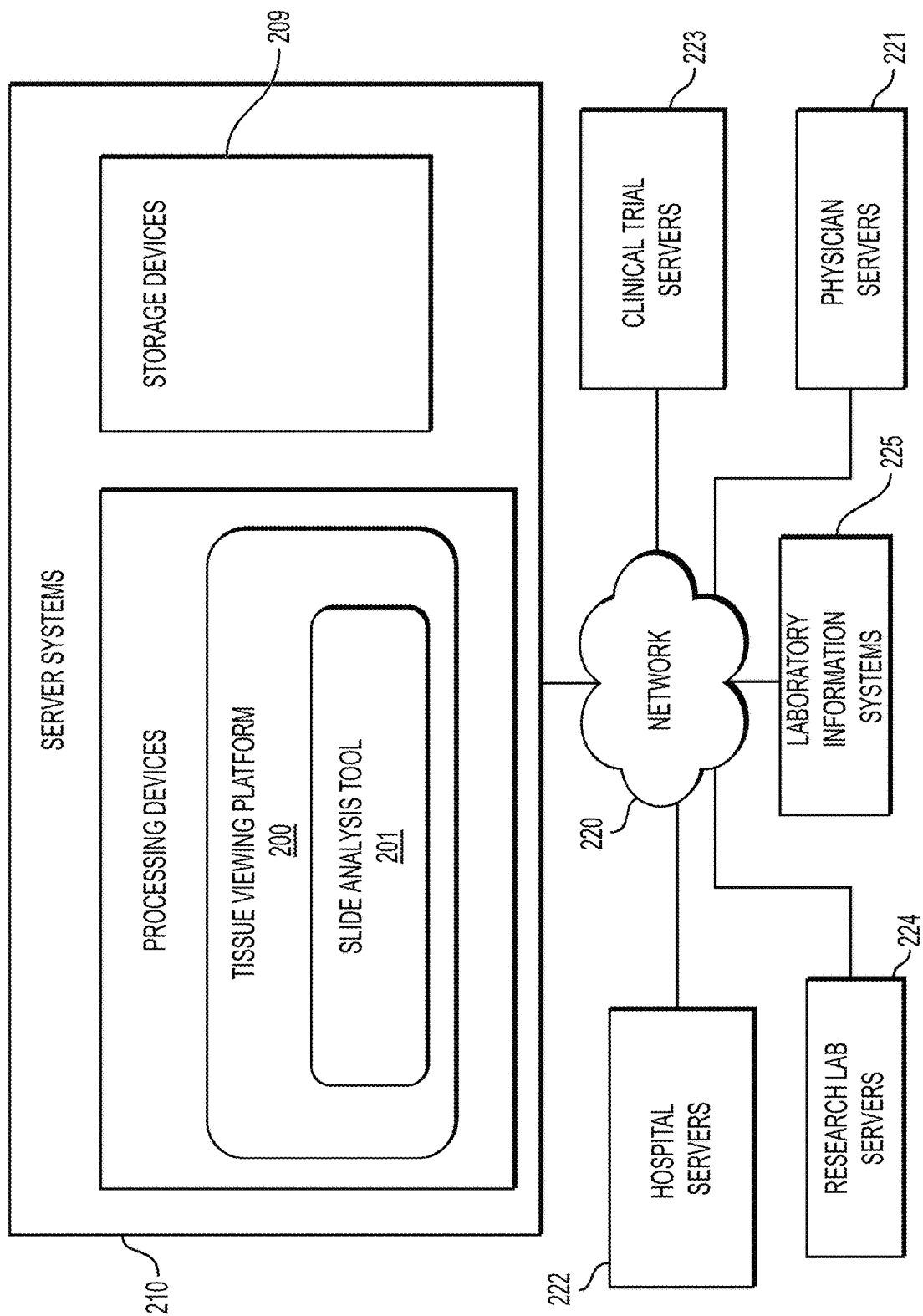
FIG. 2A illustrates an exemplary block diagram of a system and network for processing images to produce a low blur image, according to techniques presented herein.

FIG. 2A illustrates a block diagram of a system and network for processing images to produce a low blur image, using machine learning, according to an exemplary embodiment of the present disclosure.

Specifically, FIG. 2A illustrates an electronic network 220 that may be connected to servers at hospitals, laboratories, and/or doctors' offices, etc. For example, physician servers 221, hospital servers 222, clinical trial servers 223, research lab servers 224, and/or laboratory information systems 225, etc., may each be connected to an electronic network 220, such as the Internet, through one or more computers, servers, and/or handheld mobile devices. According to an exemplary embodiment of the present disclosure, the electronic network 220 may also be connected to server systems 210, which may include processing devices that are configured to implement a tissue viewing platform 200, which includes a slide analysis tool 201 for determining specimen property or image property information pertaining to digital pathology image(s), and using machine learning to classify a specimen, according to an exemplary embodiment of the present disclosure.

The physician servers 221, hospital servers 222, clinical trial servers 223, research lab servers 224, and/or laboratory information systems 225 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 221, hospital servers 222, clinical trial servers 223, research lab servers 224, and/or laboratory information systems 225 may also obtain any combination of patient-specific information, such as age, medical history, cancer treatment history, family history, past biopsy or cytology information, etc. The physician servers 221, hospital servers 222, clinical trial servers 223, research lab servers 224, and/or laboratory information systems 225 may transmit digitized slide images and/or patient-specific information to server systems 210 over the electronic network 220. Server systems 210 may include one or more storage devices 209 for storing images and data received from at least one of the physician servers 221, hospital servers 222, clinical trial servers 223, research lab servers 224, and/or laboratory information systems 225. Server systems 210 may also include processing devices for processing images and data stored in the one or more storage devices 209. Server systems 210 may further include one or more machine learning tool(s) or capabilities. For example, the processing devices may include a machine learning tool for a tissue viewing platform 200, according to one embodiment. Alternatively or in addition, the present disclosure (or portions of the system and methods of the present disclosure) may be performed on a local processing device (e.g., a laptop).

The physician servers 221, hospital servers 222, clinical trial servers 223, research lab servers 224, and/or laboratory information systems 225 refer to systems used by pathologists for reviewing the images of the slides. In hospital settings, tissue type information may be stored in one of the laboratory information systems 225. However, the correct tissue classification information is not always paired with the image content. Additionally, even if a laboratory information system is used to access the specimen type for a digital pathology image, this label may be incorrect due to the face that many components of a laboratory information system may be manually input, leaving a large margin for error. According to an exemplary embodiment of the present disclosure, a specimen type may be identified without needing to access the laboratory information systems 225, or may be identified to possibly correct laboratory information systems 225. For example, a third party may be given anonymized access to the image content without the corresponding specimen type label stored in the laboratory information system. Additionally, access to laboratory information system content may be limited due to its sensitive content.

Figure 2B:
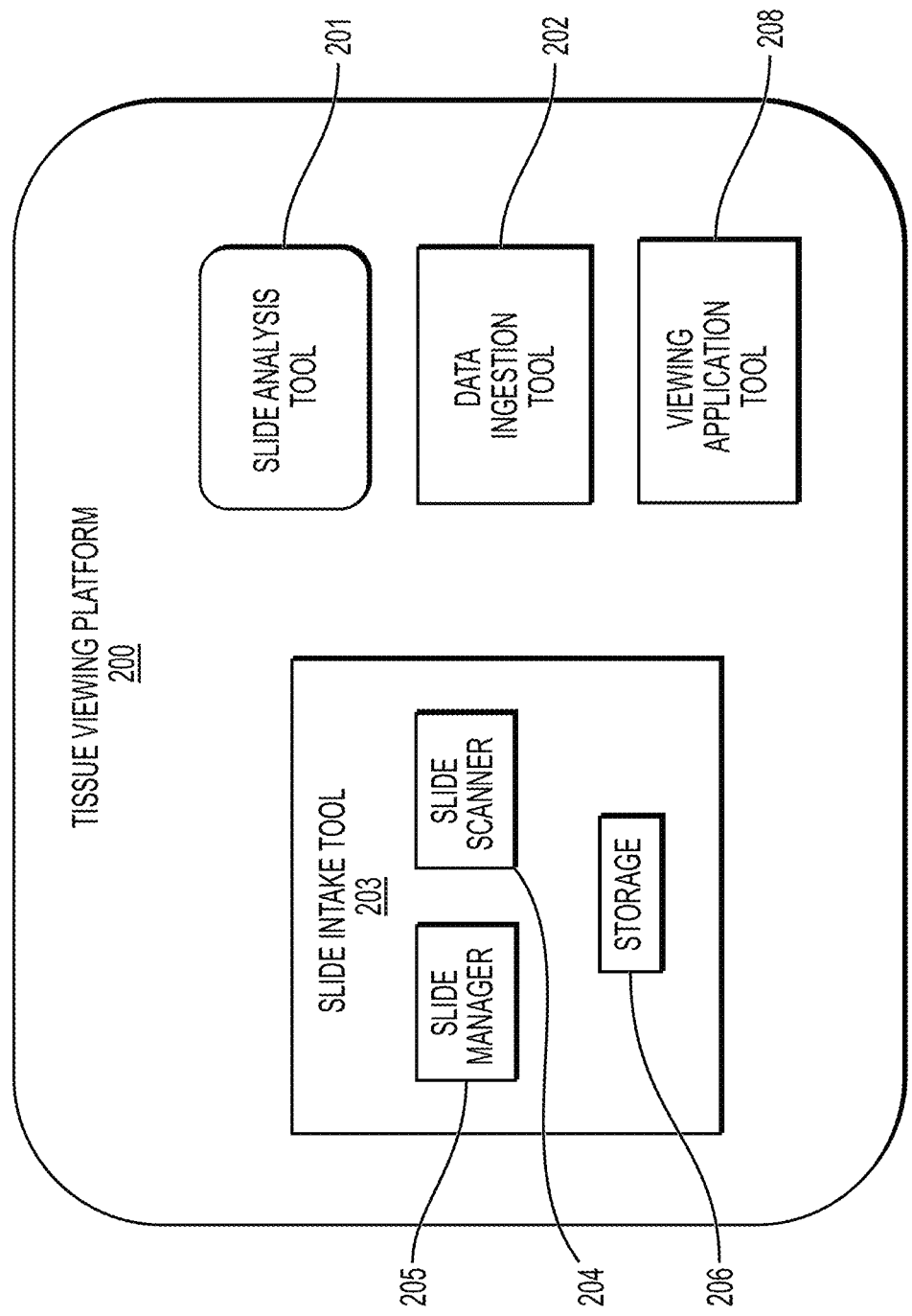
FIG. 2B illustrates an exemplary block diagram of a tissue viewing platform according to techniques presented herein.

FIG. 2B illustrates an exemplary block diagram of a tissue viewing platform 200 for determining specimen property of image property information pertaining to digital pathology image(s), using machine learning. For example, the tissue viewing platform 200 may include a slide analysis tool 201, a data ingestion tool 202, a slide intake tool 203, a slide scanner 204, a slide manager 205, a storage 206, and a viewing application tool 208.

The slide analysis tool 201, as described below, refers to a process and system for processing digital images associated with a tissue specimen, and using machine learning to analyze a slide, according to an exemplary embodiment.

The data ingestion tool 202 refers to a process and system for facilitating a transfer of the digital pathology images to the various tools, modules, components, and devices that are used for classifying and processing the digital pathology images, according to an exemplary embodiment.

The slide intake tool 203 refers to a process and system for scanning pathology images and converting them into a digital form, according to an exemplary embodiment. The slides may be scanned with slide scanner 204, and the slide manager 205 may process the images on the slides into digitized pathology images and store the digitized images in storage 206.

The viewing application tool 208 refers to a process and system for providing a user (e.g., a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 201, and each of its components, may transmit and/or receive digitized slide images and/or patient information to server systems 210, physician servers 221, hospital servers 222, clinical trial servers 223, research lab servers 224, and/or laboratory information systems 225 over an electronic network 220. Further, server systems 210 may include one or more storage devices 209 for storing images and data received from at least one of the slide analysis tool 201, the data ingestion tool 202, the slide intake tool 203, the slide scanner 204, the slide manager 205, and viewing application tool 208. Server systems 210 may also include processing devices for processing images and data stored in the storage devices. Server systems 210 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools and modules may be located on a device that may be connected to an electronic network 220, such as the Internet or a cloud service provider, through one or more computers, servers, and/or handheld mobile devices.

Figure 2C:
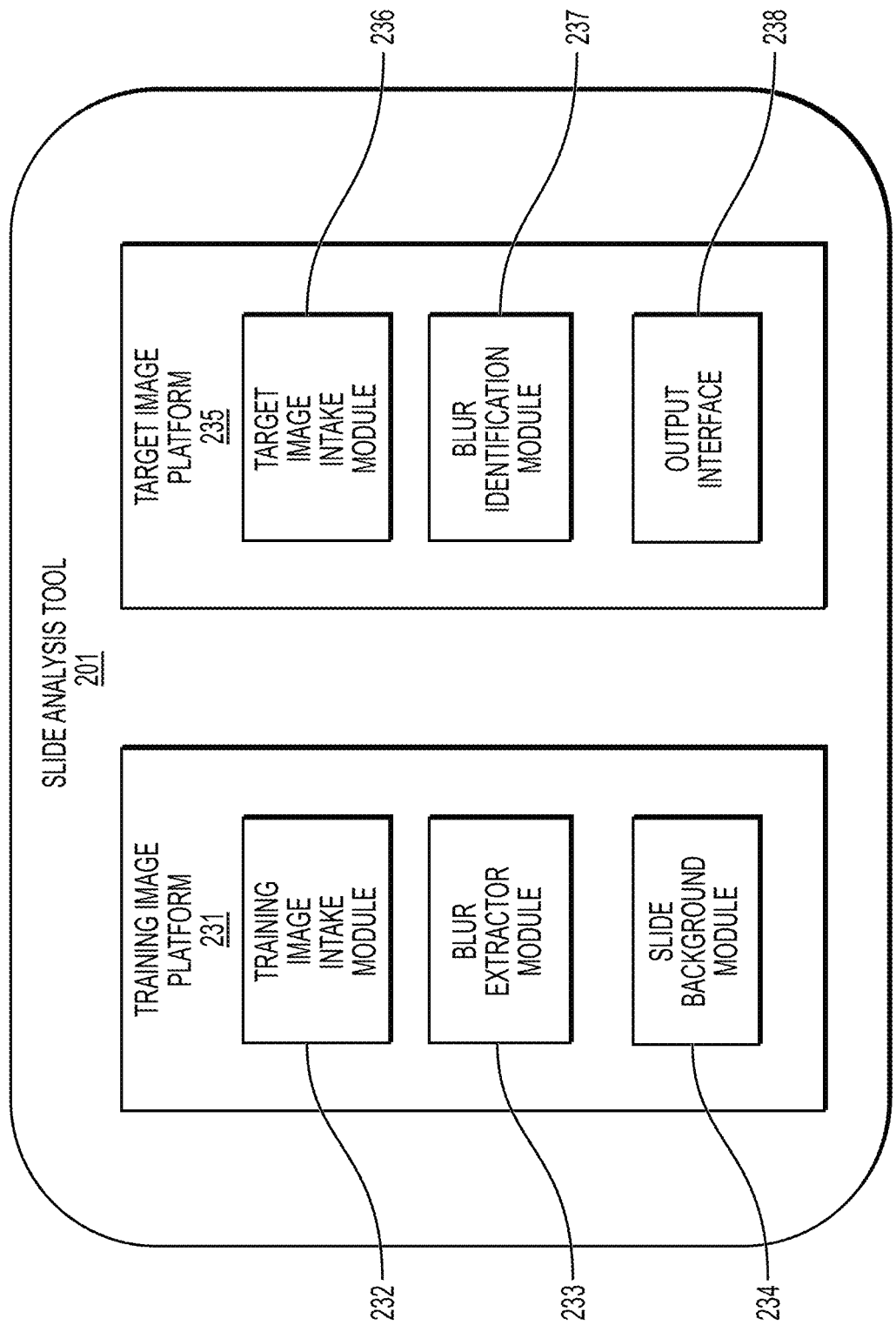
FIG. 2C illustrates an exemplary block diagram of a slide analysis tool, according to techniques presented herein.

FIG. 2C illustrates an exemplary block diagram of a slide analysis tool 201, according to an exemplary embodiment of the present disclosure. The slide analysis tool may include a training image platform 231 and/or a target image platform 235.

The training image platform 231, according to one embodiment, may create or receive training images that are used to train a machine learning system to effectively analyze and classify digital pathology images. For example, the training images may be received from any one or any combination of the server systems 210, physician servers 221, hospital servers 222, clinical trial servers 223, research lab servers 224, and/or laboratory information systems 225. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as micro-CT.

The training image intake 232 may create or receive a dataset comprising one or more training images corresponding to either or both of images of a human tissue and images that are graphically rendered. For example, the training images may be received from any one or any combination of the server systems 210, physician servers 221, and/or laboratory information systems 225. This dataset may be kept on a digital storage device. The blur extractor module 233 may intake training data related to identifying blur within training images that may greatly affect the usability of a digital pathology image. For example, the blur extractor module 233 the may use information about an entire image, e.g., the specimen type, the overall quality of the specimen, the overall quality of the glass pathology slide itself or tissue morphology characteristics, the image clarity, the level of blur located within the slide to help provide training for the machine learning techniques described herein. The slide background module 234 may analyze images of tissues and determine a background within a digital pathology image. It is useful to identify a background within a digital pathology slide to ensure tissue segments are not overlooked.

According to one embodiment, the target image platform 235 may include a target image intake module 236, a blur identification module 237, and an output interface 238. The target image platform 235 may receive a target image and apply the machine learning model to the received target image to determine a characteristic of a target specimen. For example, the target image may be received from any one or any combination of the server systems 210, physician servers 221, hospital servers 222, clinical trial servers 223, research lab servers 224, and/or laboratory information systems 225. The target image intake module 236 may receive a target image corresponding to a target specimen. The blur identification module 237 may apply the machine learning model to the WSI to determine a blur score of WSI. For example, the blur score model 237 may apply the machine learning model to de-blur WSI's; to determine a blur score of WSIs; to perform pixel-wise classification of sections/tiles of medical images; and to combine tiles/sections of medical images.

The output interface 238 may be used to output information about the target image and the target specimen (e.g., to a screen, monitor, storage device, web browser, etc.).

Figure 3:
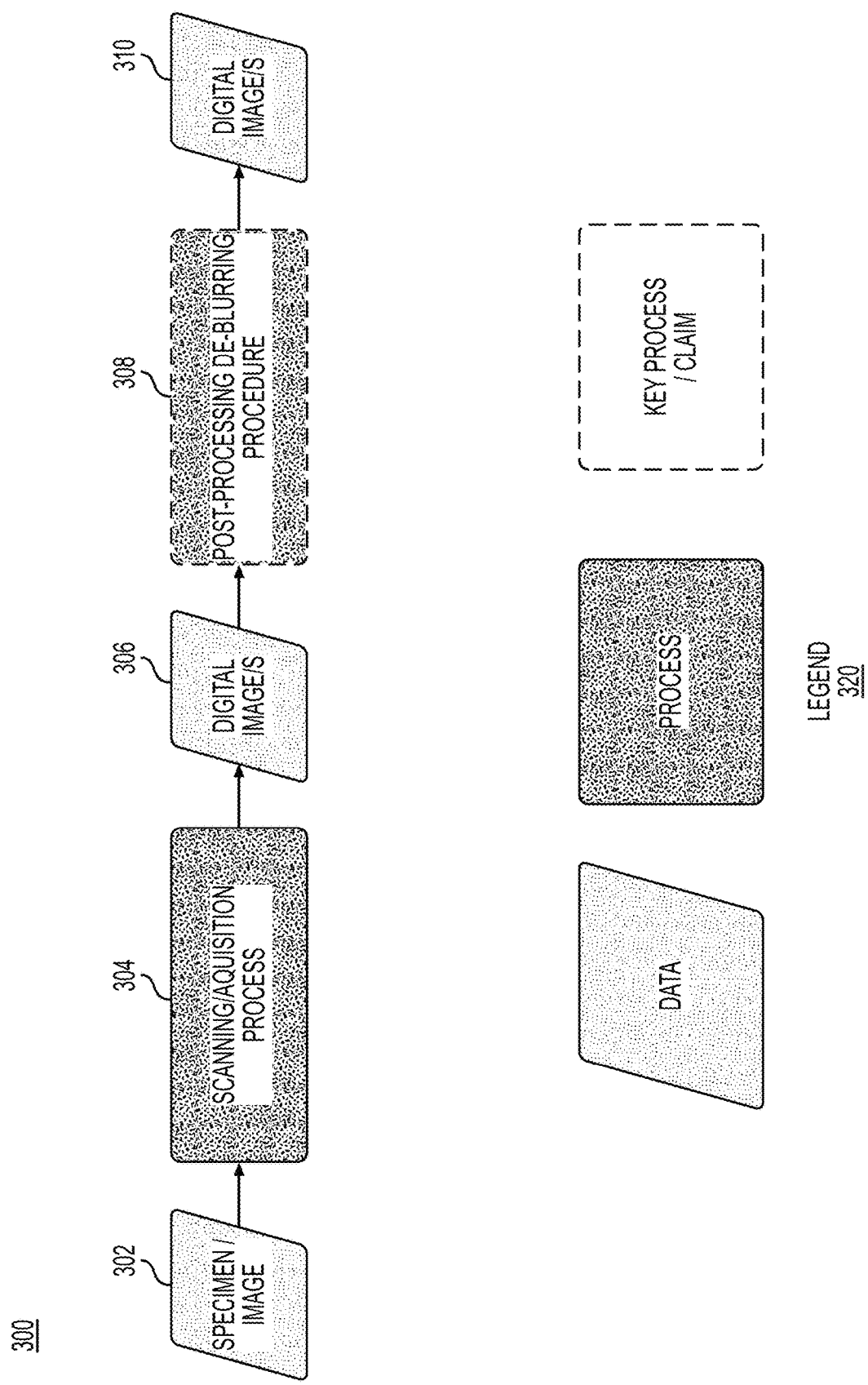
FIG. 3 illustrates a process of de-blurring one or more images, according to techniques presented herein.

FIG. 3 illustrates a process 300 for repairing blur on a set of one or more digital images, as will be described in greater detail in method 400. Process 300 may include a specimen and/or image 302 input to a scanning and/or acquisition process 304. The scanning and/or acquisition process may output one or more digital images 306. The one or more digital images 306 may then be input into a post-processing de-blurring procedure 308 described in greater detail in steps 402-414 of method 400 below, which outputs one or more modified digital images 310. The post-processing de-blurring procedure 308 may be described in greater detail in exemplary method 400. A legend 320 may indicate what form each in the process may take.

Figure 4:
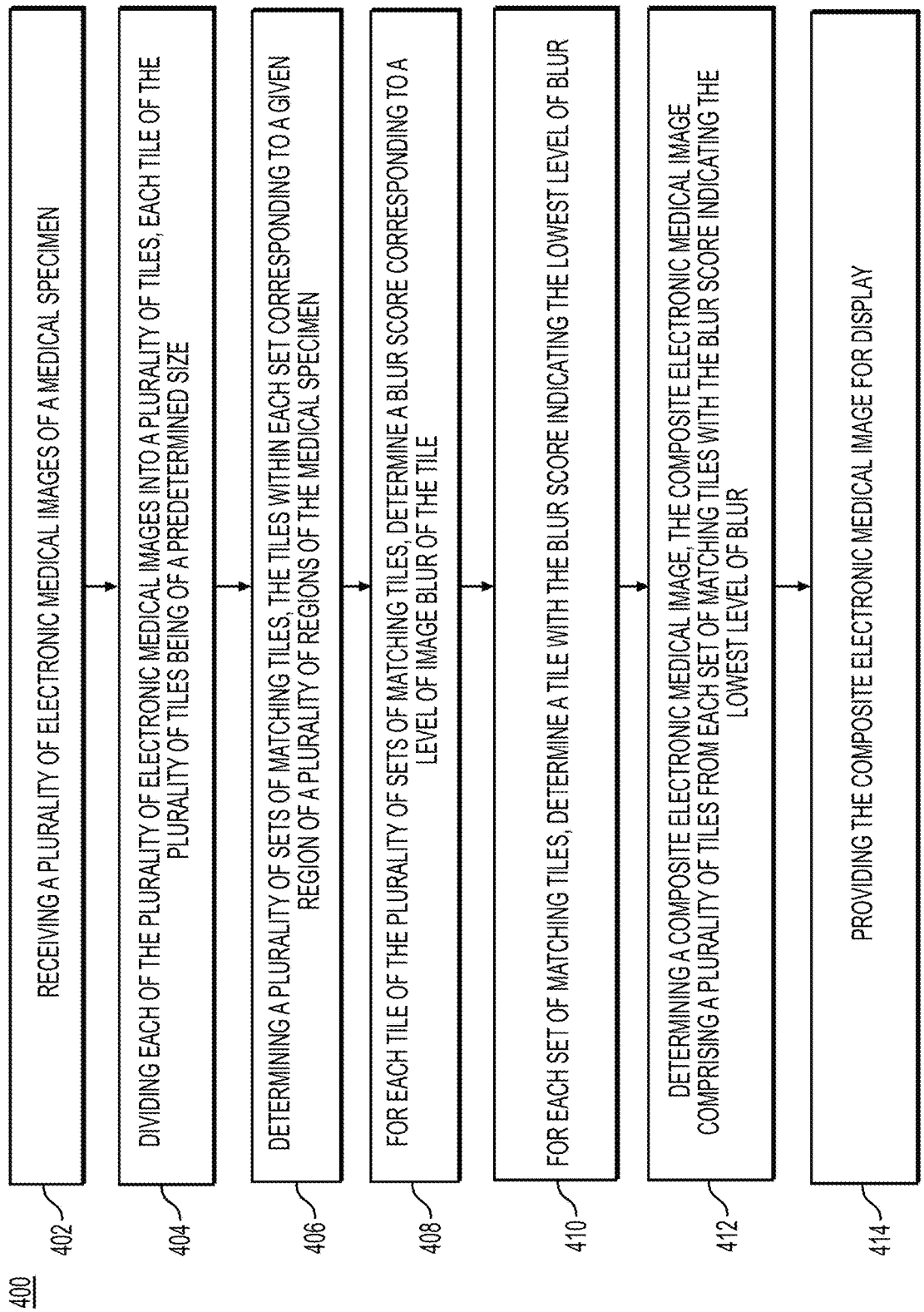
FIG. 4 is a flowchart illustrating methods for how to de-blur an image, according to techniques presented herein.

FIG. 4 is a flowchart illustrating methods for how to process an image (e.g. de-blur an image), according to one or more exemplary embodiments herein. Exemplary method 400 (e.g., steps 402-414) may be performed by slide analysis tool 201 automatically or in response to a request from a user (e.g., physician, pathologist, etc.). Alternatively, method 400 may be performed by any computer process system capable of receiving image inputs such as device 800 described in greater detail below.

At step 402, the slide analysis tool 201, hereafter referred to generally as the "system," may receive a plurality of electronic medical images of a medical specimen (e.g., tissue specimen). In one embodiment, the medical images may be images from the same perspective. In another embodiment, the images of the medical specimen may be from different perspectives. In another embodiment, the system may only receive a single medical image of a medical specimen. The medical images may be stored on electronic storage, e.g., cloud storage, hard drives, RAM, etc. The medical images received at step 402, may be equivalent to digital images 306 from FIG. 3.

At step 402, the system may receive images of a single medical specimen. Alternatively, the system may receive one or more images for each of a plurality of medical specimen. If the system receives images of more than one specimen, the system may mark and record each image based on which medical specimen it represents.

At step 404, the system may divide/split each of the plurality of electronic medical images into a plurality of tiles, each tile of the plurality of tiles being of a predetermined size. The plurality of tiles may function as electronic images. The tiles may be M×M size. Further, tile size may be dependent on what magnification level with which a medical image was processed. This may mean that at lower magnification levels, a tile of M×M pixels may represent a larger area than an M×M tile at a greater magnification level. In one embodiment, at a twenty times scanning magnification level, tiles may be a predetermined size such as 224× 224 pixels. In another embodiment, a user may be able to select from a varieties of sizes for the tile dimensions at various magnification levels. Once all inputted images from step 402 are divided into tiles, the system may then detect what tiles of the medical images are "background tiles." Background tiles may refer to tiles where the plurality of pixels do not depict the medical image. For example, the pixels may be of the surface that the medical specimen was located on. In one embodiment, the system may determine whether the tiles are background by utilizing Otsu's method. A background may be detected using Otsu's method, or some other scheme. Alternatively, the system may use any other method capable of separating the foreground from a background such as the maximum entropy thresholding method. The background tiles may be labeled or marked by the system. The system may perform no further analysis on background slides and steps 406-412 may refer only to tiles of the medical specimen.

At step 406, the system may determine a plurality of sets of matching tiles, the tiles within each set corresponding to a given region of a plurality of regions of the medical specimen. The system may first note how many electronic images, A, there are for a particular medical specimen. Next, the system may determine a plurality of sets for the medical specimen. Each set may have A tiles in it, corresponding to a tile for each medical image. The number of sets may be based on how many tiles there are for each medical specimen.

For example, the system may receive three images of a medical specimen. The system may then break each image into tiles by breaking the image into a 25 by 25 grid of tiles for each image. The system may then create 625 sets of three matching tiles.

In step 406, the system may determine corresponding tiles match from different medical images in a variety of ways. In one embodiment, each tile may be marked based on column and row, such as tile 4×7 of a medical image. The corresponding tiles would then be each tile at 4×7 for the medical images of the same medical specimen. Alternatively, the system may mark a tile based on location using any other identifying information. In another embodiment, correspondence matching techniques may be utilized to match tiles from different medical images. For example, the system may create points/features in one image that are matched with the same points or features from the next corresponding image. This may allow for tiles to be associated with each other by computer algorithms within the system even if the medical images are taken from different points of view.

In another embodiment, pixel-wise classification methods may be utilized to determine corresponding tiles. For example, the system may utilize a machine learning model to perform the pixels-wise classification of each tile. The machine learning model that performs pixel-wise classification may be trained using supervised, unsupervised learning, or semi-supervised learning. The training may be based on training data that may include general pixel-wise classification data. General pixel-wise classification data may refer to ground-truth semantic segmentation masks. The ground-truth semantic segmentation masks may contain information on an original slide image and information that describes the category of each pixel. This may be defined as a target output "image" that indicates the correct output value for each pixel. The training may be conducted such that components of the machine learning model that performs pixel-wise classification (e.g., weights, biases, layers, etc.), are adjust to output corresponding tiles based on the training data and inputted tiles. Once, pixel-wise classification is applied, the system, through machine learning techniques may be able to match the pixel-wise classification of tiles to determine sets.

In another embodiment, any form or technique related to image registration may be utilized by the system to determine corresponding tiles and creates sets from different medical images of the same medical specimen.

In step 408, the method may include, for each of the plurality of sets of matching tiles, determining a blur score corresponding to a level of image blur of the tile. The blur score may be a fraction, ratio, number, or a percentage defining the clarity of a tile. The blur score may be higher for tiles that have less defined edges and for tiles that are considered more blurry. For example, an image with a higher blur score may have less edges. The blur score per tile may be computed using Laplace variance, Fourier Transform, Wavelet Transform, using a trained Convolutional Neural Network to identify blur, etc.

In one embodiment, the system may utilize Laplace variance to determine a blur score of a tile. The system may apply a Laplace filter to find the edges of inputted tiles. Optionally, the system may first apply a grayscale to the tile prior to applying Laplace ("Laplacian") filter. The Laplacian filter may be an edge detector utilized to compute the second derivate of the image. Next, the system may compute the variance of the tile with Laplacian filter. The blur score may directly correspond with the Laplacian variance, with a lower variance corresponding to a higher blur score (e.g., a more blurry tile).

In another embodiment, the system may utilize Fast Fourier Transform ("FFT") to determine a blur score. In this embodiment, a mathematical algorithm for computing the Discrete Fourier Transform may be applied to each tile. This may convert an input tile from the spatial domain to frequency domain. Next, the system may apply a high pass filter or a band pass filter to determine edges which corresponding with high frequencies. Next, a blur score may be computed utilizing the edges detected, wherein tiles with more edges may have a higher blur score and tiles with less edges may have a lower blur score.

In one embodiment, the system may utilize a wavelet transform to determine a blur score for a tile. The system may first separate a tile into N×N inner tiles. Next, the system may apply several iterations of two-dimensional Haar Wavelet transform to each inner tile. Next, each inner tile may be grouped horizontally, vertically, and diagonally with pronounced changes into tile clusters. The blur score may be based on the amount of clusters. For example, tiles with small tile clusters may correspond to a higher blur score and tiles with large tile clusters may correspond to a low blur score. Alternatively, the blur score may be based on the ratio of the total area of the connected title clusters as compared to the whole tile.

In another embodiment, the system may utilize a machine learning model such as a convolutional neural network to determine a blur score for each tile. The machine learning model for determining a blur score may be trained using supervised, semi-supervised, or unsupervised learning. The training may be based on training data that includes tiles of medical images that contain global blur, regional blur, and local blur. The training data may have tiles with predetermined blur scores. The training may be conducted such that components of the machine learning model (e.g., weights, biases, layers) are adjusted to output blur scores based on the training data and inputted tiles. The machine learning model for determining a blur score may receive tiles as an input. The machine learning model may output blur scores associated with each tile inputted.

In step 410, the method may include, for each set of matching tiles, determining a tile with the blur score indicating the lowest level of blur (e.g. the lowest blur score from step 408). For example, if the system has received three images of a medical specimen and broken each image into 25×25 tiles (625 tiles total per image), then there will be 625 sets of three tiles. For each of the 625 sets, the system may utilize ranking algorithms to rank each of the tiles by their blur score. This may allow the system to record the highest and lowest blur score for each set of tiles of a medical specimen.

In step 412, the method may include determining a composite electronic medical image, the composite electronic medical image comprising a plurality of tiles from each set of matching tiles with the blur score indicating the lowest level of blur. The system may first identify a tile from each set with the lowest level of blur, corresponding to the highest blur score. If corresponding tiles from the same set have the same blur score, either of the tiles may be utilized in the composite electronic medical image. The system may then combine all tiles with the lowest level of blur to create a composite electronic medical image with the lowest level of blur. The system may further combine the background tiles identified at step 404. The system may utilize the background tiles from any of the medical images of the medical specimen as the background tiles may not be analyzed. Combining all tiles may include compiling, compressing, conjoining, connecting, rendering, stitching, etc., all or multiple tiles in the image together to form a new complete image of the medical specimen. The system may then perform smoothing of one or more seams of the complete image around any tiles that were replaced/combined. In other words, the only time smoothing may not be utilized is when the final medical image has tiles contacting one another that originated from the same original medical image.

Step 412 may be performed by utilizing a machine learning model referred to as composite AI model. The composite AI model may be trained using supervised, semi-supervised, self-supervised, and/or unsupervised learning. These different training methods may be combined to train the final model. The training may be based on training data that includes a plurality of tiles of particular images. The training may be conducted such that components of the composite AI model (e.g., weights, biases, layers, etc.) are adjusted to output images that are combined (through stitching and soothing) with as little indication as possible that separate tiles created the outputted image. Accordingly, the model may be trained to teach the composite AI model how to compile and stich tiles of sets of medical images most effectively.

Figure 5:
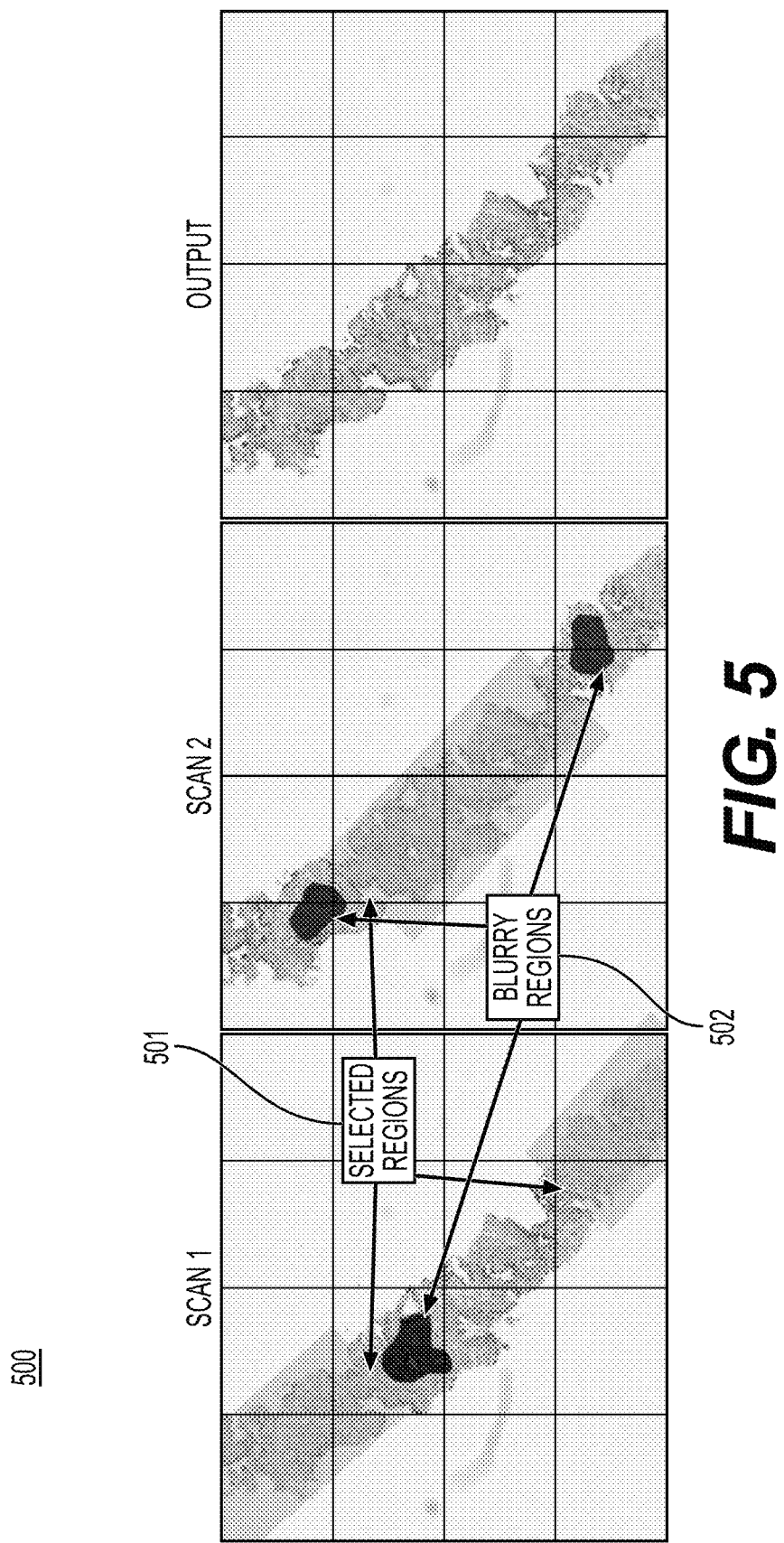
FIG. 5 illustrates an process of combining multiple scans from the same image with minor blurring to produce an image without any blur.

FIG. 5 may depict an example of step 412 being performed. FIG. 5 depicts an example with two medical images from the same medical specimen referred to as Scan 1 and Scan 2. The medical images were split into tiles (e.g. 4×4 into 16 tiles) and given blurred scores (not shown). The system may determine that scan 1 has two tile with a blurry region 502 (indicating a higher blur score then the corresponding tile on Scan 2). Scan 1 may have roughly 10% total blur. The system may further determine that Scan 2 has six tiles with blurry regions 502, wherein the blur score is higher in Scan 2 then Scan 1. Scan 2 may have roughly 20% total blur. The system may determine that all remaining tiles have equivalent blur scores. The system may then create composite electronic medical image, depicted as "Output" in FIG. 3. The composite electronic medical image may select tiles with the lowest blur score, corresponding to selected regions 501 for each set of matching tiles. Thus, the composite electronic medical image (output) may have less (or no blur) compared to Scan 1 or Scan 2.

In one embodiment, optionally, the system may keep track of a "total blur score." The total blur score may be a combined blur score of all tiles utilized in the composite electronic medical image. If the blur score is a number, the total blur score may also be a number. If blur score is a ratio or percentage, the total blur score may be an average of the blur score ratio or percentage for all tiles. If the total blur score is above a first threshold value, then the system may order a rescan of the medical image. This may occur when an image has global blur (as depicted in FIG. 1). Alternatively, if a sufficiently large number of tiles in a given location have inadequate blur scores, then the system may order a rescan of the medical image. For example, even if a total blur score is below a first threshold value, if multiple connecting tiles have high blur scores above a second threshold value, then the system may order a rescan of the medical image. For example, a composite electronic medical image may have a total blur score under a first threshold value. The system may then determine that multiple (e.g. four tiles) tiles that are connected along corresponding seams have blur scores above the second threshold value, the system may order a rescan. If a rescan is required, the system may alert the user that the system is unable to repair a blur without a new scan of the medical specimen. The request for a rescan may be done using the method as disclosed in U.S.

Patent Publication 20200381104 A1, which is incorporated herein by reference in its entirety.

In another embodiment, the system may keep track of a "secondary total blur score." In this embodiment, a secondary total blur score may be calculated for each inputted electronic medical image based on all of the tiles. The system may determine the lowest secondary total blur score of all medical images for a medical specimen. The system may then perform steps 406-410 as described above. Next, when determining a composite electronic medical image, the system may start with the initial medical image that has the lowest secondary total blur score. In this embodiment, only tiles with a blur score that are above a certain third threshold value, may be replaced. When tiles have a blur score above the third threshold value, they may be replaced with the corresponding tile with the lowest blur score of all corresponding tiles. The tiles may then be combined and soothed as described above. This embodiment may require less computing power and less overall stitching of tiles together.

Figure 6:
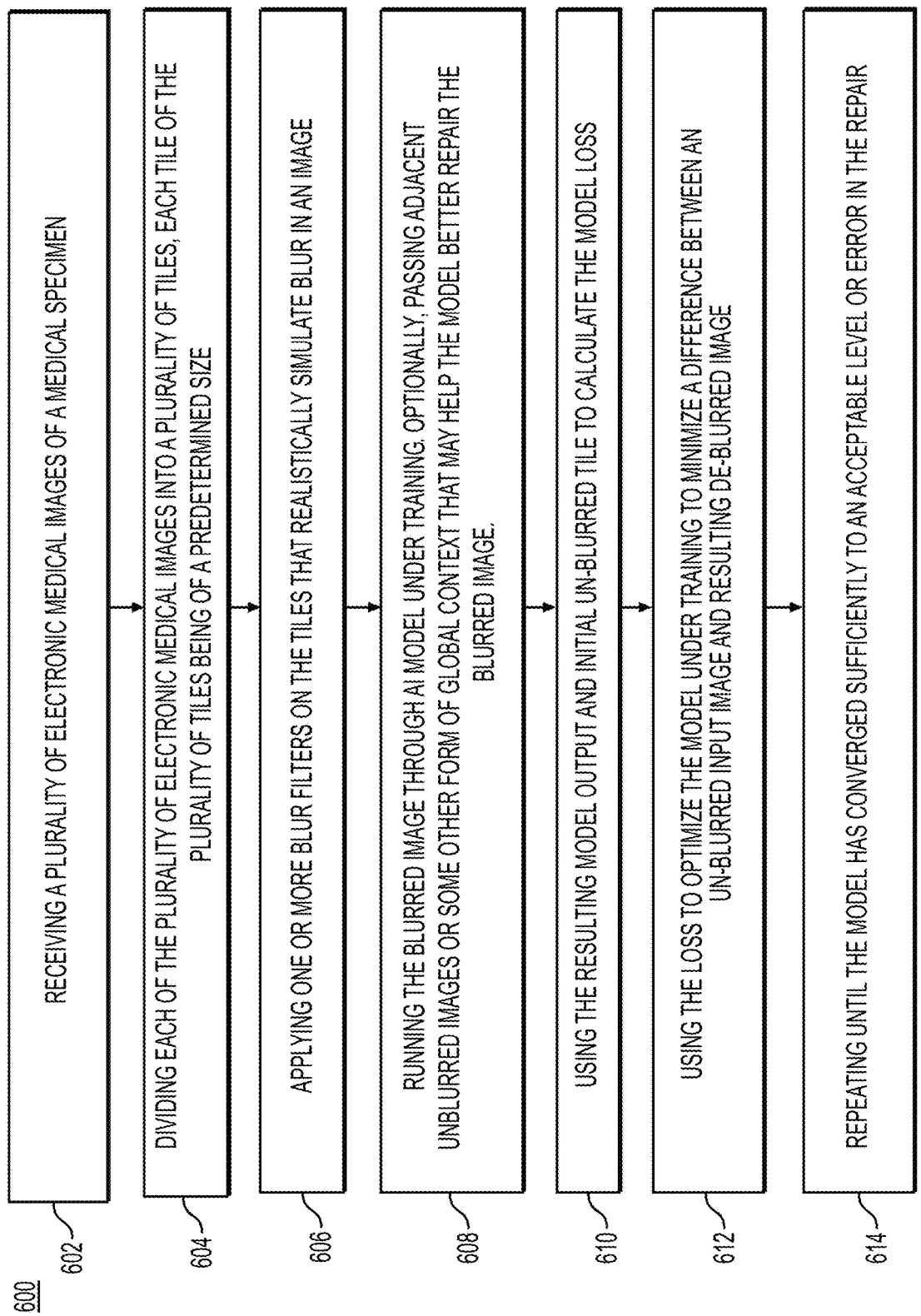
FIG. 6 illustrates a flowchart illustrating how to train an algorithm for de-blurring an image, according to techniques presented herein.

In another embodiment, the method may include, if the blur score of all tiles in a set remains too high (e.g. above a first threshold value), using conditional generative models, deep generative models, for super-resolution (e.g., a conditional generative adversarial network, conditional variational autoencoder, Flow-based generative methods, other deep learning technique using artificial neural networks, discriminative or generative model, etc.), to increase the resolution of one or more deficient tiles. This method of using conditional generative approach may be referred to as "de-blurring." The "de-blurring" may be performed by a de-blurring AI Model as described in further detail below. FIG. 6 may provide an exemplary method of training an algorithm for de-blurring using generative methods. Further, FIG. 7 may depict a workflow for training the generative de-blurring method, as described in further detail below. In this embodiment, the de-blurring may be applied to the tile in a set with the lowest blur score. Alternatively, the de-blurring could be applied to all tiles in a set and new blur scores could be calculated to determine which tile should be used in the composite electronic medical image.

In another embodiment, the method may include, if the blur score of any tiles in a composite electronic medical image are above a second threshold value, performing de-blurring on the tiles above the second threshold value. These updated tiles may then be incorporated back into the composite electronic medical image, replacing their corresponding tile.

Once trained, the generative de-blurring algorithm may receive digital images 702, corresponding to plurality of electronic medical images of a medical specimen received at step 402. The de-blurring algorithm may be capable of being applied to tiles with a high blur score and increasing the resolution of each tile. This may be referred to as de-blurring. The generative de-blurring may be utilized when the sets of tiles for a medical specimen all have a blur score above a second threshold value.

In step 414, the method may include providing the composite electronic medical image for display. The medical images may correspond with digital images 310 from FIG. 3. The method may include saving a resulting image to an electronic storage with a corresponding binary or semantic mask indicating which tiles were altered. The binary or semantic mask may include information such as which initial medical image each tile in the composite electronic medical image corresponds to, what method was utilized to determine the blur score, whether any tiles had de-blurring applied, and which tiles had de-blurring applied. The composite electronic image may be displayed on viewing application tool 208 from FIG. 2B. The composite electronic image may be exported as a file/image to other external systems. Additionally, the system may save a semantic mask indicating which tiles came from which medical image and which tiles were generated. In another embodiment, the system may save a binary mask corresponding to a composite electronic medical image, wherein the binary mask contains information on whether blur was present or not.

FIG. 6 is a flowchart illustrating an exemplary method of training an algorithm for de-blurring using generative methods, according to one or more exemplary embodiments herein. Exemplary method 600 (e.g., steps 602-614) may be performed by slide analysis tool 201 automatically when the blur scores of all tiles in a set are above a second threshold value. Additionally, a user (e.g. a pathologist) may be able to examine one or more tiles of a composite electrical medical image and choose tiles to activate de-blurring for, based on blur scores of tiles. A user may further be able to initiate de-blurring for a whole slide image or specific tiles when a user does not have access to a rescan, but blur is present in a WSI. For example, the slide may have been lost, the slide may have been sent back to an originating institution, the wait time for a rescan may have been determined to be too high, or the scan may be held downstream by another entity that does not have access to the original WSI.

In step 602, the method may include receiving a plurality of electronic medical training images of the same medical specimen. The medical specimen may be a tissue specimen. These medical images may be saved via electronic storage, e.g., cloud storage, hard drives, RAM, etc. Unlike step 402, in one embodiment, the plurality of electronic images may be screened to not include images with certain amounts of blur.

In step 604, the system may divide each of the plurality of electronic medical training images into a plurality of tiles, each tile of the plurality of tiles being of a predetermined size. The tiles may be M×M size. Similar to step 404, the method may break the image into background and non-background tiles utilizing similar techniques.

In step 606, the method may include applying one or more blur filters on a set amount of tiles in order to simulate blur in an image. This may be performed by the system applying an N×N convolution, Gaussian smoothing, or any other technique capable of creating "blur" within the inserted medical images. For example, if the system applied Gaussian soothing, a Gaussian function for calculating the transformation to apply to each pixel would be calculated. The Gaussian soothing may be applied to one or more tiles. If applied to multiple tiles, the Gaussian soothing may be applied to tiles located next to one another. The system may then save the updated tiles that have had blurring applied to them.

In step 608, the method may include inputting the plurality of blurred tiles through a de-blurring AI model as training. Optionally, the method may include inputting the adjacent unblurred tiles/images or some other form of global or non-local context that may help the model to better repair the blurred image. This may help repair blur in a situation where information within a single tile may contain insufficient information. The adjacent tiles may be adjacent in terms of x-y location or adjacent in terms of z location, the z location meaning the previous level and next level of a block (e.g. the corresponding tiles for medical images of the same medical sample). The de-blurring AI model may be trained using unsupervised, semi-supervised, or unsupervised learning. The training may be conducted such that components of the de-blurring AI model (e.g., weights, biases, layers, etc.) are adjusted to output target population based on the training data (the blurred and corresponding unblurred tiles).

In step 610, the method may include using the resulting de-blurring AI model output and initial un-blurred tile to calculate a model loss.

In step 612, the method may include using this loss to optimize the model under training to minimize the difference between the un-blurred input image and resulting de-blurred image.

In step 614, the method may include repeating the method until the model has converged sufficiently to an acceptable level or error in the repair. For example, step 614 may be performed with as many training tiles as necessary until the model is trained to de-blur tiles until the tiles receive a blur score that is under a second threshold value as described in step 412 of method 400.

Figure 7:
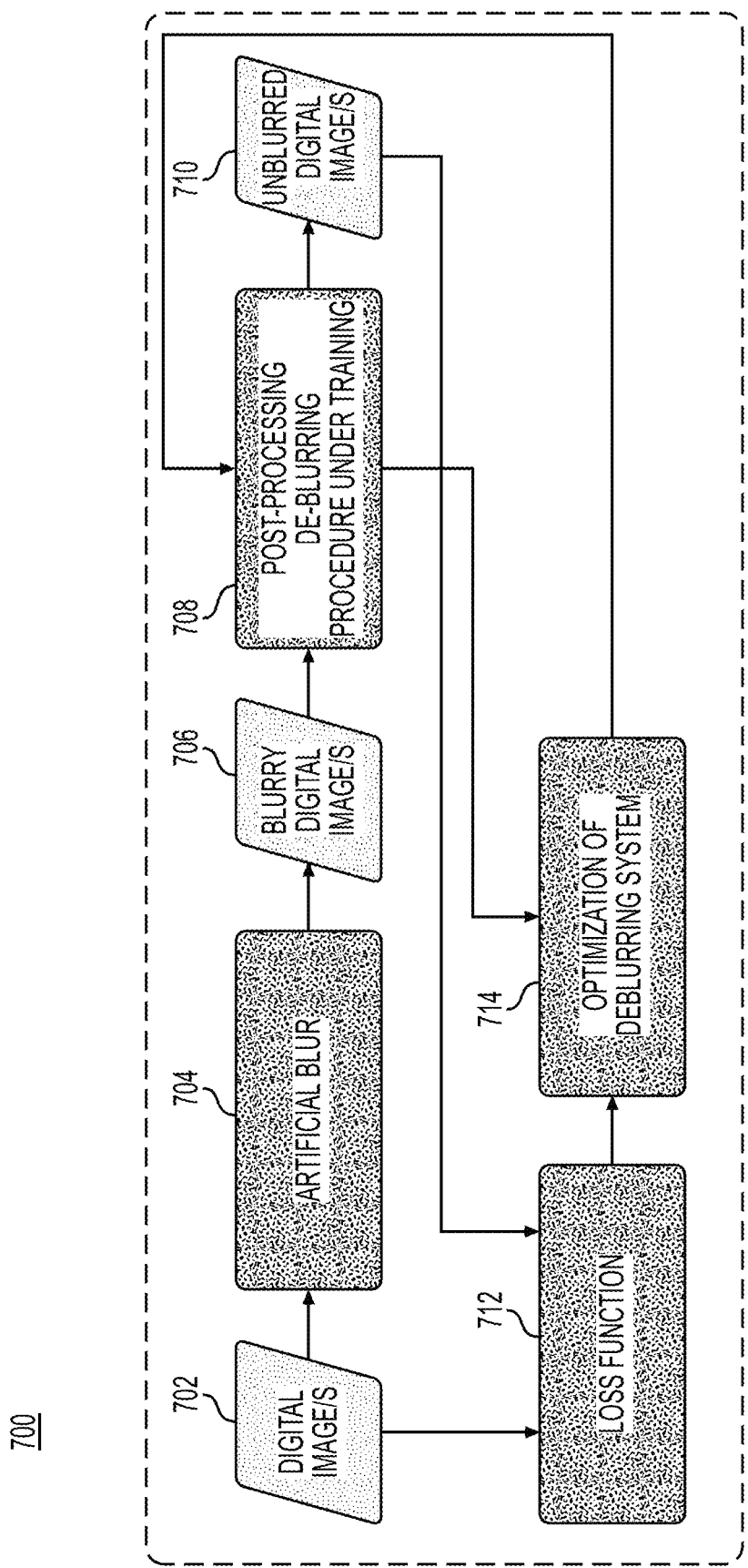
FIG. 7 illustrates a process of training a de-blurring algorithm, according to techniques presented herein.

FIG. 7 illustrates a workflow for training the generative de-blurring method, as described in method 600 above. Digital images 702 may refer to training data of medical images that contain no or negligible blur as described in step 602. The system may next, after breaking training data into tiles, apply artificial blur 704 to the training data in any of the ways described in step 606 such as N×N convolution, or Gaussian smoothing, etc. Next, the system may have blurry digital images 706 after the artificial blur 704 is applied to the medical images 702. Next, the blurry digital images 706 may be fed into the post-processing de-blurring procedure under training 708 (e.g. the de-blurring AI model described at step 608). The post-processing de-blurring procedure 708 may output an unblurred digital image 710 that attempts to negate the blur applied by artificial blur 704. Both the unblurred digital image 710 along with the original corresponding digital images 702 may then be input into lost function 712. The loss function 712 may guide the training procedure to minimize the error in the repair of the blur. The loss function may be utilized optimize the model during optimization of de-blurring system 714. The optimization of de-blurring system 714 may then be utilized to update the post-processing de-blurring procedure under training 708.

Figure 8:
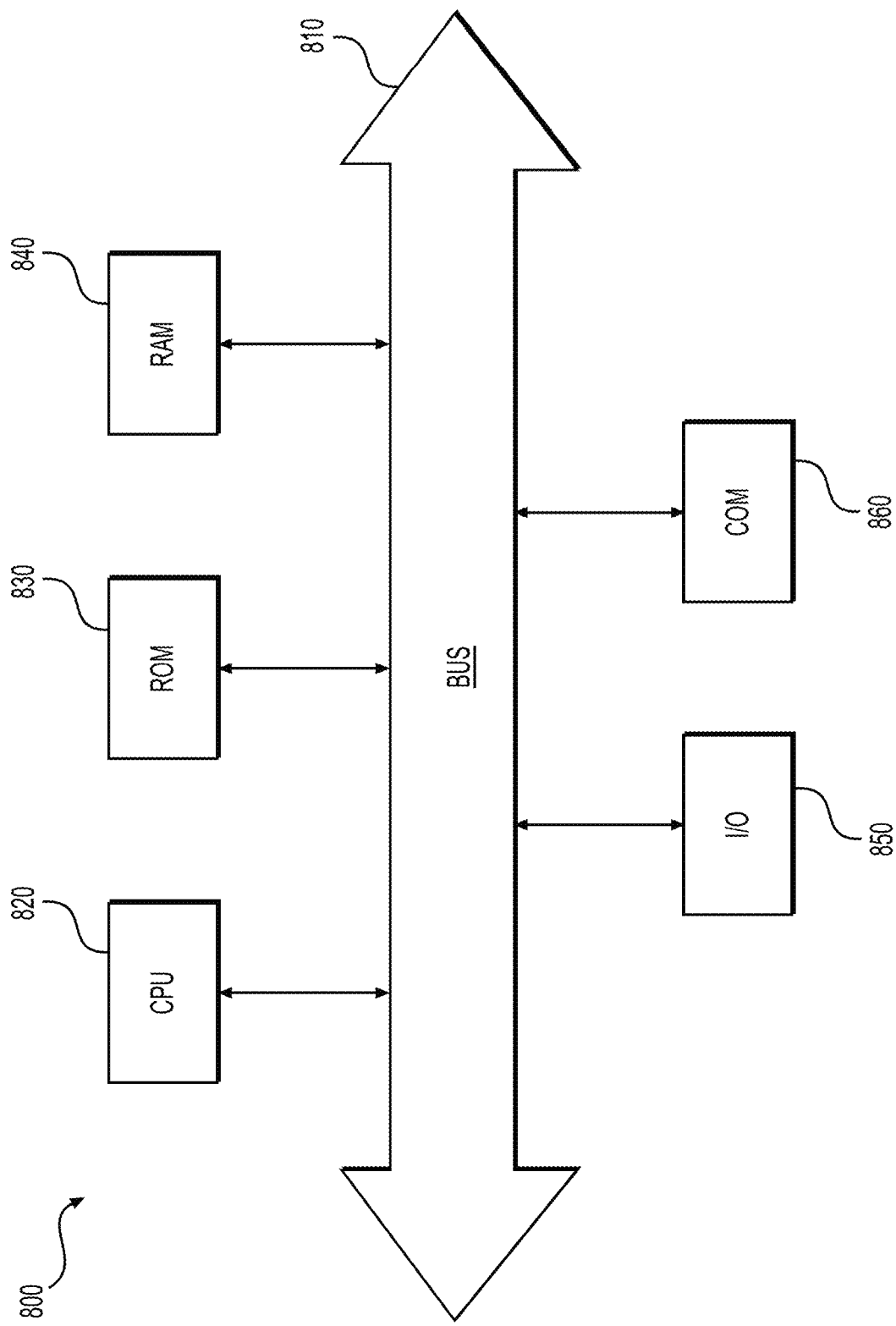
FIG. 8 depicts an example of a computing device that may execute techniques presented herein, according to one or more embodiments.

As shown in FIG. 8, device 800 may include a central processing unit (CPU) 820. CPU 820 may be any type of processor device including, for example, any type of special purpose or a general-purpose microprocessor device. As will be appreciated by persons skilled in the relevant art, CPU 820 also may be a single processor in a multi-core/multi-processor system, such system operating alone, or in a cluster of computing devices operating in a cluster or server farm. CPU 820 may be connected to a data communication infrastructure 810, for example a bus, message queue, network, or multi-core message-passing scheme.

Device 800 may also include a main memory 840, for example, random access memory (RAM), and also may include a secondary memory 830. Secondary memory 830, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 830 may include similar means for allowing computer programs or other instructions to be loaded into device 800. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 800.

Device 800 also may include a communications interface ("COM") 860. Communications interface 860 allows software and data to be transferred between device 800 and external devices. Communications interface 860 may include a modem, a network interface (such as an Ethernet card), a communications port, a PCMCIA slot and card, or the like. Software and data transferred via communications interface 860 may be in the form of signals, which may be electronic, electromagnetic, optical or other signals capable of being received by communications interface 860. These signals may be provided to communications interface 860 via a communications path of device 1300, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 800 may also include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Figure 9:
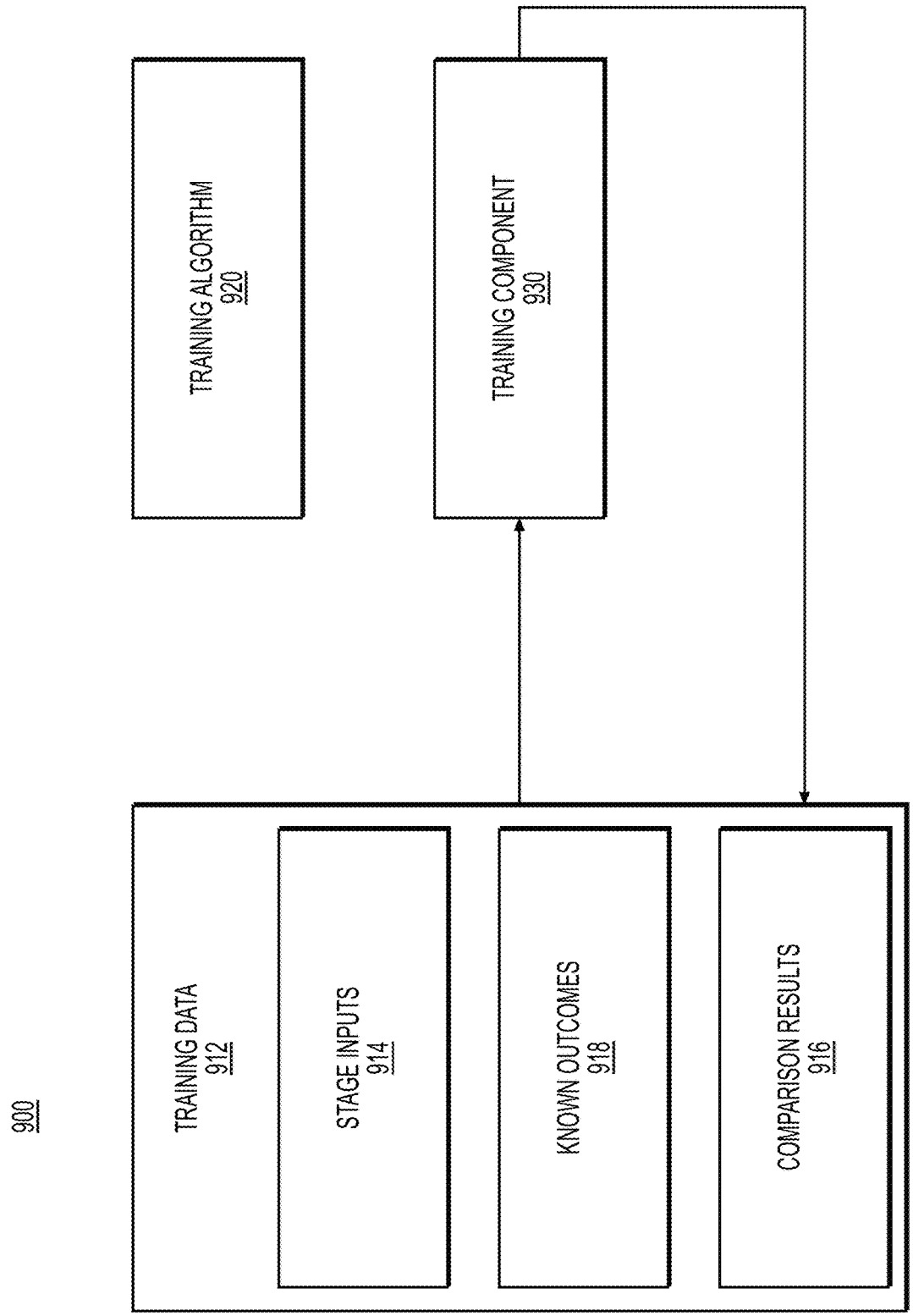
FIG. 9 depicts a flow diagram for training a machine learning model, according to one or more embodiments.

FIG. 9 depicts a flow diagram for training a machine learning model to de-blur an image, determine a blur score, combine tiles of an image, or perform pixel-wise classification, according to one or more embodiments. One or more implementations disclosed herein may be applied by using a machine learning model. A machine learning model as disclosed herein may be trained using the flow diagram 700 of FIG. 7, flowchart 400 of FIG. 4, and/or flow diagram 600 of FIG. 6. As shown in flow diagram 900 of FIG. 9, training data 912 may include one or more of stage inputs 914 and known outcomes 918 related to a machine learning model to be trained. The stage inputs 914 may be from any applicable source including a component or set described in FIG. 4, 6, or 7. The known outcomes 618 may be included for machine learning models generated based on supervised or semi-supervised training. An unsupervised machine learning model might not be trained using known outcomes 918. Known outcomes 918 may include known or desired outputs for future inputs similar to or in the same category as stage inputs 914 that do not have corresponding known outputs.

The training data 912 and a training algorithm 920 may be provided to a training component 930 that may apply the training data 912 to the training algorithm 920 to generate the de-blurring AI Model described in step 608/Post-Processing de-blurring procedure under training 708, trained blur score machine learning model of step 608, composite AI model of step 412, or trained pixel-wise classification machine learning model of step 404. According to an implementation, the training component 930 may be provided comparison results 916 that compare a previous output of the corresponding machine learning model to apply the previous result to re-train the machine learning model. The comparison results 916 may be used by the training component 930 to update the corresponding machine learning model. The training algorithm 920 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 900 may be a trained machine learning model such as the models used within De-blurring AI Model described in step 608/Post-Processing de-blurring procedure under training 708, trained blur score machine learning model of step 608, or trained pixel-wise classification machine learning model of step 404.

Techniques presented herein are not necessarily about a specific combination of image processing and computer vision that may be used to create such a system, but rather about the idea of using such tools for a purpose of resolving out-of-focus issues in diagnostic images digitally.

As described earlier, simply re-scanning an image can sometimes lead to less out-of-focus regions overall, but techniques presented herein may combine multiple images to create one that is less blurry than any single image.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention may be apparent to those skilled in the art from consideration of the specification and practice of the invention disclosed herein. It is intended that the specification and examples be considered as exemplary only.

What is claimed is:

1. A computer-implemented method for processing electronic medical images, the method comprising: receiving a plurality of electronic medical images of a medical specimen; dividing each of the plurality of electronic medical images into a plurality of tiles, each tile of the plurality of tiles being of a predetermined size; determining a plurality of sets of matching tiles, the tiles within each set corresponding to a given region of a plurality of regions of the medical specimen; for each tile of the plurality of sets of matching tiles, determining a blur score corresponding to a level of image blur of the tile; determining whether if a predetermined threshold of tiles in a given location have inadequate blur scores; upon determining that the predetermined threshold is exceeded, ordering a rescan of the corresponding medical image for each set of matching tiles, determining a tile with the blur score indicating the lowest level of blur; determining a composite electronic medical image, the composite electronic medical image comprising a plurality of tiles from each set of matching tiles with the blur score indicating the lowest level of blur; and providing the composite electronic medical image for display.

2. The computer-implemented method of claim 1, further comprising: determining a total blur score, the total blur score corresponding to an average of the blur score of all tiles within a medical image, wherein if the total blur score is above a threshold value, a rescan of the corresponding medical image is ordered.

3. The computer-implemented method of claim 1, wherein the blur score is output by a machine learning model that receives the plurality of tiles, the machine learning model applying, to the tiles, one or more weights, biases, and/or layers, and outputting a blur score for each tile.

4. The computer-implemented method of claim 1, wherein the step of determining a composite electronic medical image is performed using a machine learning model.

5. The computer-implemented method of claim 1, further comprising: upon determining each tile within a set has a blur score above a threshold value, using at least one conditional generative model to create a higher resolution of the tile.

6. The computer-implemented method of claim 5, wherein using a conditional generative model comprises inputting a tile with the lowest blur score into a de-blurring machine learning model that applies the tile data to one or more of de-blurring models weight, biases, or layers, and outputs a tile corresponding tile with a lower blur score.

7. The computer-implemented method of claim 1, further comprising:
providing a corresponding semantic mask indicating which tiles were altered of the composite medical image.

8. A system for processing electronic digital medical images, the system comprising: at least one memory storing instructions; and at least one processor configured to execute the instructions to perform operations comprising: receiving a plurality of electronic medical images of a medical specimen; dividing each of the plurality of electronic medical images into a plurality of tiles, each tile of the plurality of tiles being of a predetermined size; determining a plurality of sets of matching tiles, the tiles within each set corresponding to a given region of a plurality of regions of the medical specimen; for each tile of the plurality of sets of matching tiles, determining a blur score corresponding to a level of image blur of the tile; determining whether if a predetermined threshold of tiles in a given location have inadequate blur scores; upon determining that the predetermined threshold is exceeded, ordering a rescan of the corresponding medical image for each set of matching tiles, determining a tile with the blur score indicating the lowest level of blur; determining a composite electronic medical image, the composite electronic medical image comprising a plurality of tiles from each set of matching tiles with the blur score indicating the lowest level of blur; and providing the composite electronic medical image for display.

9. The system of claim 8: further comprising: determining a total blur score, the total blur score corresponding to an average of the blur score of all tiles within a medical image, wherein if the total blur score is above a threshold value, a rescan of the corresponding medical image is ordered.

10. The system of claim 8, wherein the blur score is output by a machine learning model that receives the plurality of tiles, the machine learning model applying to the tiles, one or more weights, biases, and/or layers, and outputting a blur score for each tile.

11. The system of claim 8, wherein the step of determining a composite electronic medical image is performed using a machine learning model.

12. The system of claim 8, further comprising: upon determining each tile within a set has a blur score above a threshold value, use using at least one conditional generative model to create a higher resolution of the tile.

13. The system of claim 12, wherein using a conditional generative model comprises inputting a tile with the lowest blur score into a de-blurring machine learning model that applies the tile data to one or more of De-blurring models weight, biases, or layers, and outputs a tile corresponding tile with a lower blur score.

14. The system of claim 8, further comprising:
providing a corresponding semantic mask indicating which tiles were altered of the composite medical image.

15. A non-transitory computer-readable medium storing instructions that, when executed by a processor, perform operations processing electronic digital medical images, the operations comprising: receiving a plurality of electronic medical images of a medical specimen; dividing each of the plurality of electronic medical images into a plurality of tiles, each tile of the plurality of tiles being of a predetermined size; determining a plurality of sets of matching tiles, the tiles within each set corresponding to a given region of a plurality of regions of the medical specimen; for each tile of the plurality of sets of matching tiles, determining a blur score corresponding to a level of image blur of the tile; determining whether if a predetermined threshold of tiles in a given location have inadequate blur scores; upon determining that the predetermined threshold is exceeded, ordering a rescan of the corresponding medical image for each set of matching tiles, determining a tile with the blur score indicating the lowest level of blur; determining a composite electronic medical image, the composite electronic medical image comprising a plurality of tiles from each set of matching tiles with the blur score indicating the lowest level of blur; and providing the composite electronic medical image for display.

16. The non-transitory computer-readable medium of claim 15, wherein the blur score is output by a machine learning model that receives the plurality of tiles, the machine learning model applying to the tiles, one or more weights, biases, and/or layers, and outputting a blur score for each tile.

17. The non-transitory computer-readable medium of claim 15, the operations further comprising: providing a corresponding semantic mask indicating which tiles were altered of the composite medical image.

* * * * *

UNITED STATES PATENT AND TRADEMARK OFFICE
CERTIFICATE OF CORRECTION

PATENT NO. : 12,169,915 B2
APPLICATION NO. : 17/732857
DATED : December 17, 2024
INVENTOR(S) : Rodrigo Ceballos Lentini and Christopher Kanan Page 1 of 1

It is certified that error appears in the above-identified patent and that said Letters Patent is hereby corrected as shown below:

In the Claims

In Column 19, Line 14, in Claim 12, before "using" delete "use".

Signed and Sealed this
Fifteenth Day of April, 2025

Coke Morgan Stewart
*Acting Director of the United States Patent and Trademark Office*